| United States Patent [19] | [11] 4,009,323 |
|---|---|
| Bennion et al. | [45] Feb. 22, 1977 |

[54] STORAGE BATTERY COMPRISING POSITIVE ELECTRODE OF A GRAPHITE AND LITHIUM FLUORIDE COMPOUND

[75] Inventors: Douglas N. Bennion, Sepulveda, Calif.; Ranna K. Hebbar, Hightstown, N.J.; Sanjay L. Deshpande, Los Angeles, Calif.

[73] Assignee: The United States of America as represented by the Secretary of the Navy, Washington, D.C.

[22] Filed: May 12, 1975

[21] Appl. No.: 576,923

[52] U.S. Cl. .............................. 429/194; 429/218
[51] Int. Cl.$^2$ ........................................ H01M 43/00
[58] Field of Search ........ 136/6 R, 6 LN, 20, 83 R, 136/121–122, 100 R, 137, 76, 34; 429/194, 218

[56] References Cited

UNITED STATES PATENTS

| 3,536,532 | 10/1970 | Watanabe et al. | 136/83 R |
| 3,700,502 | 10/1972 | Watanabe et al. | 136/83 R X |
| 3,844,837 | 10/1974 | Bennion et al. | 136/6 LN |
| 3,892,590 | 7/1975 | Gunther | 136/83 R |

*Primary Examiner*—Anthony Skapars
*Attorney, Agent, or Firm*—R. S. Sciascia; Paul N. Critchlow

[57] ABSTRACT

A positive electrode of a storage battery is formed by applying an electrical charge through a non-aqueous lithium perchlorate solution to an electrode formed of powdered "Madagascar"-type graphite and lithium fluoride.

3 Claims, 3 Drawing Figures

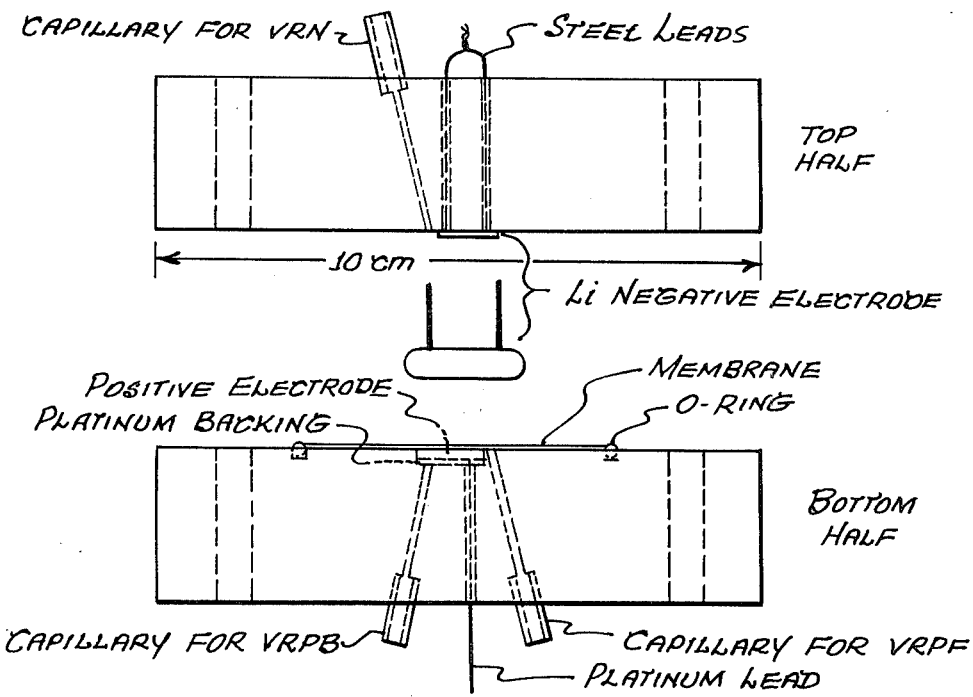
FIG. 1. Closed cell for the system.
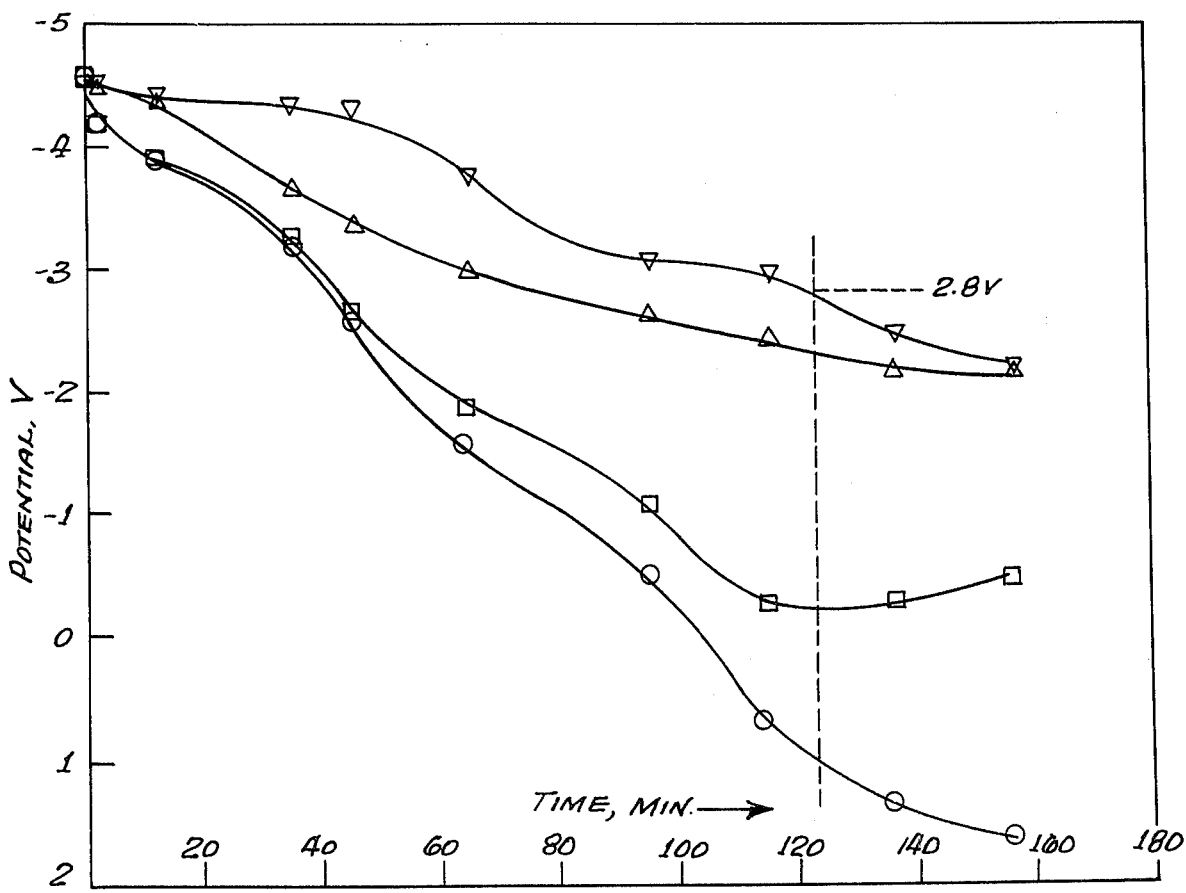
FIG. 2. Discharging curve for Li-CF$_x$ cell.
Q=92.17×10$^{-6}$ Equiv. ○ VC, □ VRN, △ VRPF, ▽ VRPB.

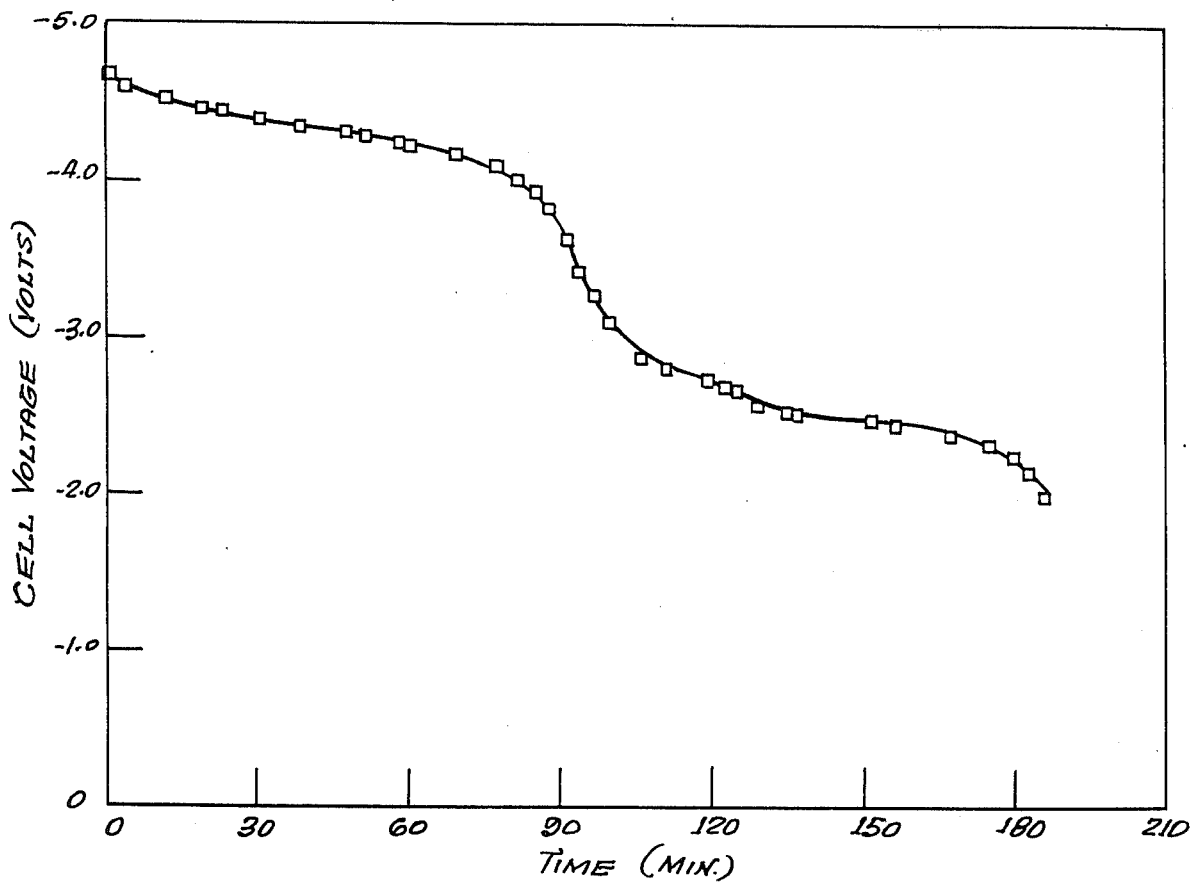
FIG. 3. DISCHARGE CURVE, Li/LiClO₄, DMSU/C, LiF, 1.2M LiClO₄ IN DMSU. 1.1 mA/cm² DISCHARGE. CHARGE OUT = 0.133×10⁻³ eq/cm² CUT-OFF VOLTAGE = 2.0V.

STORAGE BATTERY COMPRISING POSITIVE ELECTRODE OF A GRAPHITE AND LITHIUM FLUORIDE COMPOUND

BACKGROUND OF THE INVENTION

The present invention relates generally to storage battery systems having high energy storage per unit weight and, in particular, to the formation of positive lithium electrodes for use in such systems.

A battery stores energy by employing a reducing agent such as lead as an anode or negative electrode and an oxidizing agent such as lead dioxide as the cathode or positive electrode. An electrolytic solution such as sulfuric acid in water is used between the electrodes. When energy is withdrawn, the reducing agent (lead) gives up electrons which flow through an external circuit and are received by the oxidizing agent (lead dioxide) at the positive electrode. Ions, such as hydrogen ions and sulfate ions must flow through the electrolytic solution between the electrodes to complete the circuit. Some type of chemical compound, such as lead sulfate, is produced as a result of the combination of these processes. The product or discharge compounds are stored usually in a porous structure of one or both of the electrodes.

As the above processes take place there is a net overall decrease in the chemical energy within the cell. Some of this energy is recovered to do useful work and some to drive the processes occurring within the battery. If the electrodes contact one another a short circuit causes the battery to discharge and rapidly run down. Separators or membranes therefore are placed between the electrodes, although, of course, the membranes must allow ion transport. Also, chemical shorting may result when the oxidizing agent is dissolved in the electrolytic solution and this problem is resolved by using oxidizing agents which are insoluble or nearly insoluble in the solution.

For a successful storage battery system to work, the above-described processes must occur in reverse. By using an external power supply, the flow of electrons should be reversible to the extent that the reducing agent and oxidizing agent are reformed at the negative and positive electrodes. In some systems, metal reducing agents, such as zinc or lithium tend to grow as so-called dendrites across the gap between the electrodes. When dendrites bridge the gap between the electrodes, a short occurs unless suitable membranes are deployed.

Energy-storing, reversible systems, such as the batteries used for vehicle propulsion or for powering small boats, portable tools, appliances, space satellites, etc., are designed to provide maximum energy storage per unit weight of the battery. In other words, these batteries must have a high energy and power density. Other design considerations involve the life of the battery, its cost and, of course, the operating efficiency. Usually, there is some sort of trade-off between these desirable characteristics.

To provide batteries capable of storing more energy per unit weight, it is desirable to utilize negative electrodes formed of the more powerful reducing agents which have relatively lower equivalent weights than, for example, conventional lead or cadmium. Also, the positive electrodes should use oxidizing agents which again are more powerful and of lower equivalent weights than lead dioxide or nickle oxide. Lithium, as is knwon, is one of the strongest reducing agents and it has an equivalent weight of only 7. It also can become relatively economical since its availability is about the same as lead and its cost, therefore, can be expected to drop with increased demand.

Lithium, therefore, appears to be a highly desirable reducing agent and this desirability has been recognized rather extensively in the available literature. For example, its use is discussed at some length in the following references:

Jasinski, Raymond, *High Energy Batteries*, Plenum Press, New York, 1967.

Jasinski, Raymond, "Electrochemical Power Sources in Nonaqueous Solvents", *Electrochem. Technology*, 6, 28-35 (1968)

Tiedemann, W. H. and D. N. Bennion. "Chemical and Electrochemical Behavior of Lithium Electrodes in Dimethysulfite Electrolyte Solutions," *J. Electrochem. Soc.*, 120, pp. 1624, 1973.

However for a variety of reasons no practical storage battery yet has been demonstrated using lithium negative or positive electrodes. The principle reason apparently has been the inability to develop suitable positive electrodes. In this regard, it is known that lithium reacts spontaneously with water and protons. Consequently, electrolytic solutions for lithium systems must be nonaqueous, aprotic solutions and one of the difficulties has been the problem of providing a positive electrode capable of operating reversibly in the nonaqueous solvents. In particular, the positive electrodes should be sufficiently insoluble to prevent chemical shorting. The literature, as already noted, apparently does not describe significantly successful results. Most of the effort has gone into using chlorides, fluorides, or sulfides of copper, silver or nickle. Oxides of molybdenum also have been tried but, in general, these compounds either dissolve in the electrolytic solution or simply are inactive.

Graphite intercalation positive electrode compounds also have been studied. For example, work in this area is described in:

Ubbelohde, A. R., "Overpotential Effects in the Formation of Graphite Nitrates," *Carbon*, 7, 5234530 (1968).

Croft, R. C., "Lamellar Compounds of Graphite," *Quarterly Reviews* (London), 14, 1-45 (1960).

Similar work also is described in U.S. Pat. No. 3,844,837 "Non-Aqueous Battery" issued Oct. 29, 1974 to Bennion et al. This patent, in particular, describes the electrochemical formation of intercalated compounds of graphite with perchlorate ions from non-aqueous aprotic solutions. Generally, the electrochemical reaction at the positive electrode appears to be:

$$nC + ClO_4^- \rightarrow C_nClO_4 + e^-.$$

However, it also has been found that there is a rather significant limitation in that the above reaction proceeds well only when $n$ is greater than 90. For an $n$ less than 90, solvent decomposition apparently occurs at the same time as intercalation is occuring. Such a large value of $n$ coupled with the solvent decomposition seriously detracts from the practical potential of these batteries particularly when high energy density is a design factor.

It also is known that fluorine forms a special class of intercalation compounds with graphite and this material has been used successfully for making primary but not storage batteries. When used for primary batteries, the intercalation compounds has been formed by gas phase fluorine reacting with small particles of graphite. There has been no indication in the literature that such compounds can be formed electrochemically to provide reversible positive electrodes for storage battery systems. The previous work in this field is reported in:

Braeuer, Klaus, H. M., "Reserve Type Organic Electrolyte Batteries", 4th Inter-Society Energy Conversion Engr. Conf., Washington, D. C., Sept. 1969, pp 525-527 Watanabe, Nobuatsu and Masataro Fukuda, "Primary Cell for Electric Batteries", U.S. Pat. No. 3,536,532, Oct. 27, 1970 Fukuda, Masataro and Taskashi Iijima, "The Lithium/Poly-Carbon Monofluoride Battery," Abstract 41, Fall Meeting The Electrochemical Society, Oct. 1971

The electrochemical formation of carbon fluoride compounds $(C_nF)_x$ clearly would open the way for development of storage batteries using this compound as the active material in the positive electrodes. Such a development would be useful since, if $n$ is small, $(C_nF)_x$ has a very low equivalent weight and it is a strong oxidizing agent. Further, it is insoluble and for $n$ close to, but greater than, one it has relatively good conductivity.

The present invention therefore has as its primary object the electrochemical formation of an energy-storing reversible electrode for use in a battery system. In general, this object is accomplished by applying the charging current through a non-aqueous lithium salt solution to an electrode compounded from graphite and lithium fluoride. It appears that such a process is capable of electrochemically forming $(C_nF)_x$ compound where $n$ goes from a rather large number to some value between 1 and 2.

BRIEF DESCRIPTION OF THE DRAWINGS

The present invention is illustrated in the accompanying drawings of which:

FIG. 1 is a schematic view of a test cell which represents the battery system of the present invention and which was used in conducting various tests which will be described;

FIG. 2 is a discharge curve for the test cell of FIG. 1, and

FIG. 3 is a table listing data obtained from a number of test runs using the present battery system.

DETAILED DESCRIPTION OF THE INVENTION

FIG. 1 represents the battery system of the present invention. As will be recognized, the FIG. 1 illustration actually is a test cell used in a number of test runs made for determining such factors as the coulombic efficiency and other significant factors which will be described. However, it should serve to illustrate the manner in which an operative system would be implemented.

As shown, the FIG. 1 cell includes a lithium negative electrode which can be identified by the legend on the drawing, a positive electrode formed of graphite and lithium fluoride, an electrolyte which is lithium perchlorate dissolved in dimethyl sulfite and a semipermeable membrane separating the positive and negative electrodes. As will be recognized, the electrode spacing in this cell is quite limited so that the amount of the electrolyte per unit volume of the electrode also is limited. Obviously, any commercial storage battery constructed in accordance with the present principles would differ in structural arrangement.

The battery system itself can be expressed in the following manner:

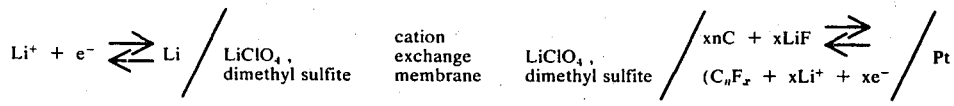

The lithium which forms the negative electrode, can be a commercial grade lithium foil. The lithium perchlorate-dimethyl sulfite electrolyte solution is between 1 and 3 molar, and it is carefully purified to reduce water content below 100 ppm. The final water removal is performed by mixing the solution with lithium chips. The membranes generally used for the test runs have included various types of commercially available, radiation cross-linked, radiation-grafted polypropylene or polyethylene cation exchange films.

As to the positive electrode, best results have obtained with finely divided (1 micrometer characteristic dimension) and purified Madagascar graphite. This material is a naturally occurring graphite which geologically has been subjected to very high temperature and pressure to the extent that it is a crystalline material having few imperfections. Other tested materials have produced rather disappointing results to the extent that it appears that the use of a Madagascar-type graphite, whether naturally occurring or otherwise, provides a significant contribution. The purifying of the graphite consists mainly of washing it with various strong acid solutions to dissolve silicate and other metal oxide impurities. Another location of natural graphite is in Northern New York.

The lithium fluoride a commercially available, purified material which has been powdered (1 micrometer characteristic dimension) and vacuum dried at high temperature (800° C). The graphite and lithium fluoride may be mixed together in approximately equal molar ratios although the exact proportion, instead of being critical, appears to be a matter of assuring a sufficiency of graphite to provide good matrix conductivity. As indicated, graphite cloth or platinum may be used as a current collector. In some runs, such as that illustrated by the discharge curve of FIG. 3, the positive electrode is bound into a porous, solid plate and electrical contact made directly to the plate above the cell. To make a plate, the natural graphite - lithium fluoride mixture is mixed with an organic material to make a paste. The paste is formed into an electrode and fired in an inert atmosphere at about 800° C. In other runs the graphite and lithium fluoride mixture is contained in a cup or a recess and electrical contact is assured by mechanical pressure.

The overall cell reactions, as previously indicated, appear to be predominately as follows:

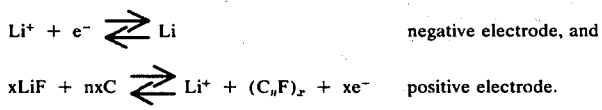

negative electrode, and positive electrode.

The charge (upper arrows) of the positive electrode takes place at between 4.0 and 4.5 volts relative to a reversible lithium electrode in the same solution. Discharge (lower arrows) takes place at between 2.8 and 3.5 volts relative to a reversible lithium electrode in the same solution, although, as shown in FIG. 2 a part of the discharge curve takes place above 3.8 volts.

Before describing the test results, it should be helpful to understand in greater detail the various electrical leads which provide reference points for establishing the interior voltage of the FIG. 1 cell. Generally, the leads were employed to locate the losses within the cell. Thus, as will be noted, the FIG. 1 cell provides four potential differences which can be measured and these potential differences are provided by the so-called capillary leads shown by the legend of FIG. 1. Referring to FIG. 1, VRPB which identifies a voltage reference of the potential of a lithium wire at the rear of the positive electrode minus the potential of the positive electrode. VRPF is the potential of a lithium wire at the front of the positive electrode on the positive electrode side of the membrane separator minus the potential of the positive electrode. VRN is the potential of the lithium wire in the negative electrode compartment minus the potential of the positive electrode. VC is the lithium negative electrode minus the potential of the positive electrode. In principle, VRPB is the total available driving force of the cell. VRPB minus VRPF represents the potential loss through the positive electrode. VRPF minus VRN is the potential drop across the membrane. VRN minus VC is the loss due to a film and other irreversibilities at the surface of the lithium electrode. VC is the net or effective cell potential at the operating current density.

It will be recognized that these interpretations are somewhat idealistic and there may be processes as yet unknown which would cause distortions in the current density distribution so as to require other interpretations of the potential measurements. The potentials which are reported are actual observations and, to convert to the more usual sign convention used in theoretical studies, the experimental observations should be multiplied by minus one.

Other factors which effect the experimental results and which have raised some questions include, for example, the fact that any water in the cell reacts spontaneously with the lithium producing hydrogen gas. Although the quantity of gas formed in the battery system is relatively small, even the small quantities may have an adverse effect. Obviously, the various parts of the systems must be as moisture-free or devoid of water as possible. As to the electrolytic solution, the minimum water content can be achieved by vacuum distillation of the solvent and the vacuum drying of the finely divided lithium perchlorate followed by mixing the solution with lithium chips to scavenge any remaining water. Also, the finely divided graphite-lithium fluoride mixtures and the membrane separators must be dry. These mixtures can be heated in a vacuum oven and transferred through an antechamber transfer box to assure that no moisture is picked up during the transfer. Membrane separators, however, cannot be vacuum heated without damaging them. consequently, the present technique is to soak the membranes in DMSU with lithium chips so that the water in the membrane will transfer into the DMSU and react with the chips.

The membranes themselves constitute a continuing subject for investigation, although the research that has been conducted has shown that radiation treated porous polypropylene membranes are most appropriate. These membranes have been developed by and obtained from the RAI Research Corporation, Hauppauge, L. I., N. Y. They are identified as experimental membranes labeled RAI 1101-28 No. 1 and RAI 1101-29 No. 2. Other membranes, although satisfactory for eliminating dendritic shorts, nevertheless, may demonstrate a large voltage drop across the membrane in the order of 5 to 10 volts. The so-called experimental membranes demonstrate significantly lower resistance losses.

FIGS. 2 and 3 provide test results obtained using the FIG. 1 cell. FIGS. 2 and 3 represent discharge curve data for the cell. The following Table provides data on a number of runs to demonstrate coulombic efficiency as well as other operating characteristics.

TABLE 1

Summary of Cycles for the Lithium - Graphite Cell
Positive Electrode: 0.0312 g Asbury Graphite Powder
0.0286 g Lithium Fluoride

| Run No. | Date Begun | Equivalents in (×10⁶) | Equivalents out (×10⁶) | VRP Cut Off Volt | Nominal c.d. mA/cm² | Coul./g Out |
|---|---|---|---|---|---|---|
| 1 | 12/4/73 | 341.1 | 286.4 | −2.75 | 0.5 | 885 |
|   |         |       | 428.1 | −2.67 | 0.5 | 1330 |
| 2 | 12/5/73 | 677.0 | 477.0 | −2.80 | 1.5 | 1480 |
|   |         |       | 679.5 | −2.60 | 1.5 | 2190 |
| 3 | 12/7/73 | 267.1 | 175.8 | −2.62 | 0.3 | 545 |
| 4 | 12/10/73 | 560.0 | 16.1 | −2.76* | 1.5 | 50 |
| 5 | 12/12/73 | 133.2 | 64.8 | −2.75 | 1.5 | 202 |
| 6 | 12/12/73 | 827.4 | 163.6 | −2.71 | 1.0 | 508 |
| 7 | 12/13/73 | 188.2 | 307.2 | −2.68 | 1.5 | 955 |
| 8 | 12/13/73 | 705.3 | 709.4 | −2.80 | 1.5 | 2200 |
| 9 | 12/15/73 | 932.2 | 1005.7 | −2.85 | 1.5 | 3120 |
| 10 | 12/16/73 | 1015.8 | 1032.3 | −3.0 | 1.5 | 3200 |
| 11 | 12/18/73 | 1348.0 | 1230.1 | −2.96 | 1.5 | 3820 |
| 12 | 12/21/73 | 1790.8 | 1328.0 | −2.99 | 2.0 | 4130 |

TABLE 1-continued

| 13 | 12/23/73 | 1291.2 | 1023.8 | −3.55** | 1.0 | 3180 |

*In the absence of any membrane.
**Discharge was terminated when discharge current fell below 0.50 mA.

As to the charging cycle of the cell, which is not illustrated the losses on charging at 1 milliamp (VC-VRPB) have been found to be 1 volt or less. There appear to be no irreversibilities at the lithium electrode (VC-VRN). Losses across the membrane (VRN-VRPF) begin small but get large quickly and slowly decrease. This behavior is likely due to concentration variations which arise during passage of current. The reason for the decrease is not clear and it may be due to a minor artifact arising because of shifts with time and current density distribution relative to the reference electrodes. Overall, the charging curves have appeared quite good and with improved engineering design a good battery could result based on this charging evidence alone if, as presently assumed, the negative electrode reaction is:

$$Li^+ + e^- \rightarrow Li,$$

and the dominant positive electrode reaction is $$(nx)c + xLiF \rightarrow (C_nF)_x + xLi^+ + xe^-.$$

Thus, based on the present assumptions, as well as an ability to control side reactions, a viable secondary battery system can be provided having a relatively low cost and high energy density.

FIGS. 2 and 3 show discharge cures for the present battery system, FIG. 2 being derived from experiments using the specially placed reference electrodes which already have been identified and FIG. 3 demonstrating an overall cell performance. In FIG. 3, the input was $0.2 \times 10^{-3}$ equivalents per cm². Discharge was $0.12 \times 10^{-3}$ equivalents/cm² to a cutoff cell voltage (VC) of 2.0 V. Current density was held constant at 2 mA/cm² during charging and 1 mA/cm² during discharging. Other tests conditions and results are noted in the legend of FIG. 3.

FIG. 2 provides significant evidence that a reversible positive electrode is achieved. In this run, VRPF remains high. The losses in the positive electrode, VNPB-VRPF, appear tolerable. The large losses across the membrane, as well as the losses at the negative electrode, are important and improvement should be achieved in these areas.

In general, FIG. 2 demonstrates the existence of three distinct plateaus. Looking at VRPB, the upper plateau is from −4.5 down to −4.1 V in magnitude. The middle plateau is from −3.2 down to −2.8 V. Below −2.5 V another plateau appears to be forming. The plateau for VRPB below −2.6 V in magnitude is believed due to solvent decomposition as the reduction reaction. This plateau is known to go on for many hours and generally it is avoided except when over discharging by mistake as happened to occur at the end of the FIG. 2 run. Since it has been possible to identify at least one solvent reaction plateau, it appears reasonable that the plateaus at higher, more positive potential relative to lithium are not due to solvent reduction. FIG. 3 shows only VC, but here two distinct plateaus are noted, one about −4.0 V and another between −2.3 V and −2.8 V in magnitude. The lower plateau can be viewed as two plateaus close together. Thus, although problems with membranes, as well as films forming on the lithium and the making of good electrical contacts persist, the positive electrode consistently yields two discharge plateaus one just above and the other just below 3.0 V relative to a lithium reference electrode. When measuring just VC, the plateaus are shifted down in magnitude due to cell losses. Charging of the positive electrode consistently takes place between 4.5 and 5.0 V relative to a lithium reference electrode.

The interpretation of the FIG. 2 and 3 observations, as well as a large number of other observations derived from test runs, is that the finely divided (1 micrometer size), purified, 'Madagascar' graphite electrochemically forms intercalation compounds with perchlorate and fluoride ions. The perchlorate only intercalates to the extent that its composition $C_nClO_{-4}$ is one in which the $n$ is in the order of 90. This reaction only occurs above 4.0 V relative to a reversible lithium electrode. Below 4.0 V relative to lithium the fluoride does not appear to react with the carbon. It may be that the perchlorate is needed to activate the graphite so that the fluoride will react in which case there is a synergistic effect of the perchlorate. For large charge storage, the net reaction appears to be almost entirely the intercalation of the fluoride:

$$nC + xLiF \rightarrow (C_nF)_x + xLi^+ + xe^-$$

In the above reaction, at full charge, $n$ can be as low as 1.95 and it may be possible to take $n$ down to 1. However, $C_4F$ is a known stoichiometric compound of relatively high electronic conductivity. CF is a known stoichiometric compound of very low conductivity. Thus, as $n$ goes from 4 to 1, it might be expected that internal losses within the positive electrode will get progressively larger. At $n$ equal to 4, charge storage capabilities are many times larger than any existing commercial, storage battery. It might be noted that the subscript $x$ as used in expressing $(C_nF)_x$ simply emphasizes that the compound is part of a polymer-type matrix.

In conclusion, experiments using specially-placed reference electrodes (FIG. 2) and overall cell performance (FIG. 3) have demonstrated that a natural graphite-lithium fluoride positive electrode can reversibly store up to $10^{-3}$ equivalents/cm² as shown in the foregoing table. It seems that the acceptable hypothesis for satisfactorily explaining the observations is that the active species formed in the positive electrode is a nonstoichiometric intercalation compound of graphite and fluorine.

Obviously many modifications and variations of the present invention are possible in the light of the above teachings. It is therefore to be understood that within the scope of the appended claims the invention may be practiced otherwise than as specifically described.

We claim:
1. A sealably-enclosed storage battery system comprising:
a negative electrode, formed of lithium, a positive electrode formed of a graphite and lithium fluoride compound, and an electrolyte solution formed of non-aqueous aprotic solvent and a lithium salt.

2. The system of claim 1 wherein said electrolytic solution is formed of lithium perchlorate dissolved in dimethysulfite.

3. The system of claim 9 further including:
a moisture-free cation-exchange membrane disposed between said electrodes.

* * * * *